May 19, 1959 H. FÜLLING ET AL 2,887,534

SYSTEM FOR TRANSMITTING TELEPRINTER MESSAGES

Filed June 12, 1957 3 Sheets-Sheet 1

Inventors.
Heinrich Fülling,
Kurt Schüssler, &
Hans Rudolph.
By [signature] Atty.

Inventors.
Heinrich Fülling,
Kurt Schüssler, &
Hans Rudolph.
By. [signature] Atty.

SYSTEM FOR TRANSMITTING TELEPRINTER MESSAGES

Filed June 12, 1957 3 Sheets-Sheet 3

Inventors.
Heinrich Fülling,
Kurt Schüssler, &
Hans Rudolph,
By [signature] Att'y.

United States Patent Office 2,887,534

Patented May 19, 1959

2,887,534

SYSTEM FOR TRANSMITTING TELEPRINTER MESSAGES

Heinrich Fülling and Kurt Schüssler, Munich, and Hans Rudolph, Munich-Solln, Germany, assignors to Siemens and Halske Aktiengesellschaft, Berlin and Munich, Germany, a German corporation Application June 12, 1957, Serial No. 665,286

Claims priority, application Germany June 21, 1956

9 Claims. (Cl. 179—3)

The present invention is concerned with a system for transmitting teleprinter messages, comprising tone frequency transmitters and receivers associated with the individual subscribers, particularly for central exchange operation.

It is known in the teleprinter art to use, instead of teleprinter transmission devices and lines, those of the telephone system, and to assign to the individual teleprinter subscribers, in addition to their teleprinter and a telephone, tone-frequency transmitters which produce a tone-frequency lying within the speech frequency range which tone-frequency is in its turn modulated in its amplitude by the D.C. signals transmitted by the teleprinter. This transformation, at the subscriber's station, of direct current into an amplitude modulated tone-frequency avoids the use of special transmission devices required for the transmission of the teleprinter messages and the connecting routes can be switched through over long distances without relays, as customary in the telephone art.

However, despite these advantages, this teleprinter technique which has also been called single-tone telegraphy, for various reasons has not found general acceptance. Thus, for instance, in telephony, since the subscribers must always be present to accept calls, no particular criteria are customary for the supervision of connections. For this reason, single-tone telegraphy required special supervisory measures, for instance the transmission of a continuous tone from the called subscriber in order to assure the transmitting subscriber that the message transmitted by him reached the called subscriber in full.

Another disadvantage of single-tone telegraphy resides in uneconomical utilization of toll lines. It must be considered in this connection that one telephone channel affords the possibility of providing for up to 24 teleprinter channels, since the teleprinter channels require a considerably narrower frequency range than the telephone channels.

In addition to these disadvantages, the type of modulation used in single-tone telegraphy, namely amplitude-modulation, was relatively subject to noise as a result of the generally large line attenuation to be bridged for teleprinter operation. Furthermore, with this type of modulation (tone or no tone), there is no usable criterion for the supervision of the transmission paths.

For these reasons, single-tone telegraphy failed to gain favor in the teleprinter technique and direct current telegraphy was retained; in other words, direct current signals were transmitted from subscriber to subscriber, which on long lines only were converted into alternating current signals in accordance with the principle of amplitude modulation or recently also in accordance with the principle of frequency modulation, so as to save channels.

The various objects and features of the invention will appear from the description which will be rendered below with reference to the accompanying drawings.

Figure 1:
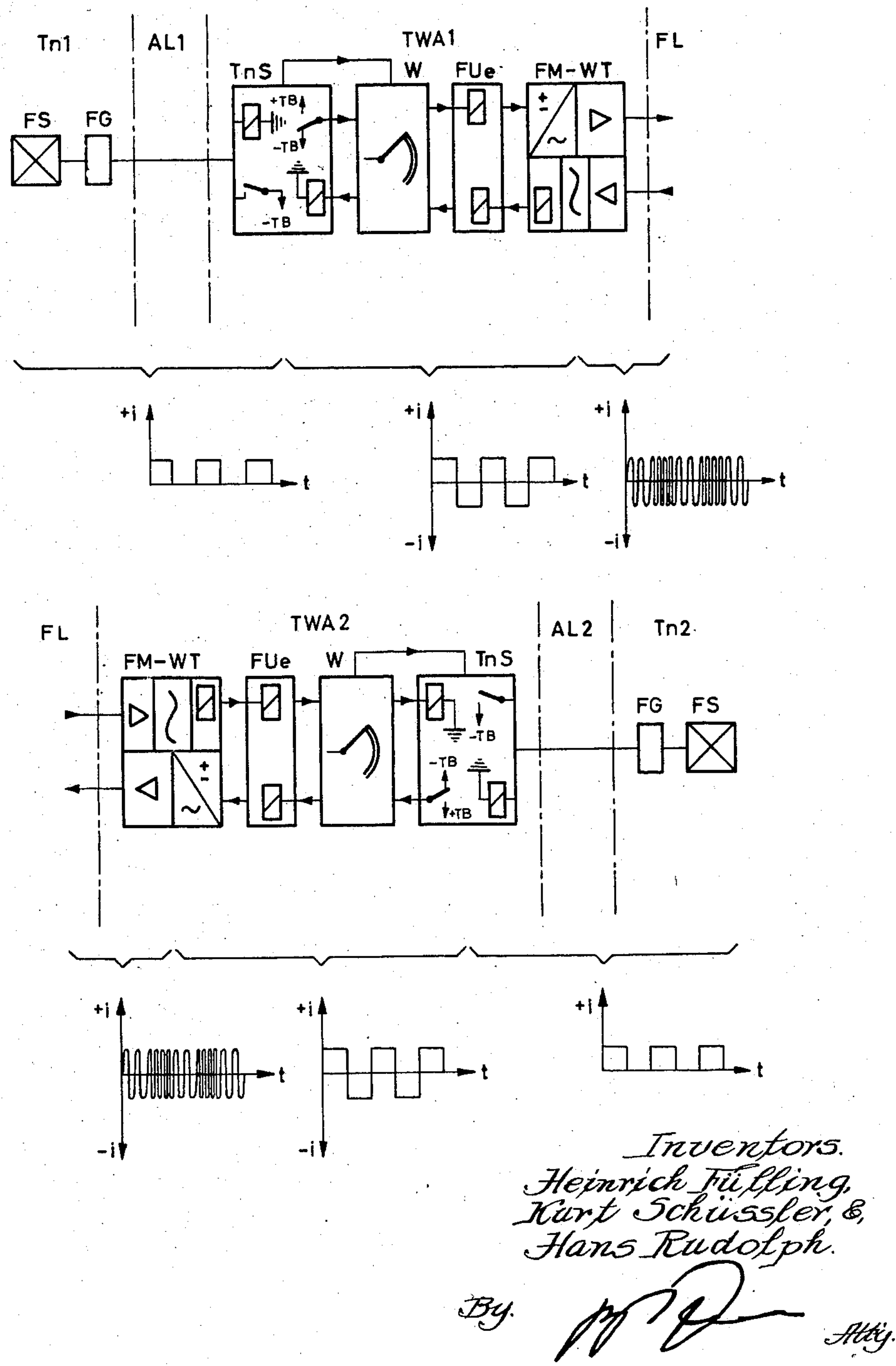
Figure 2:
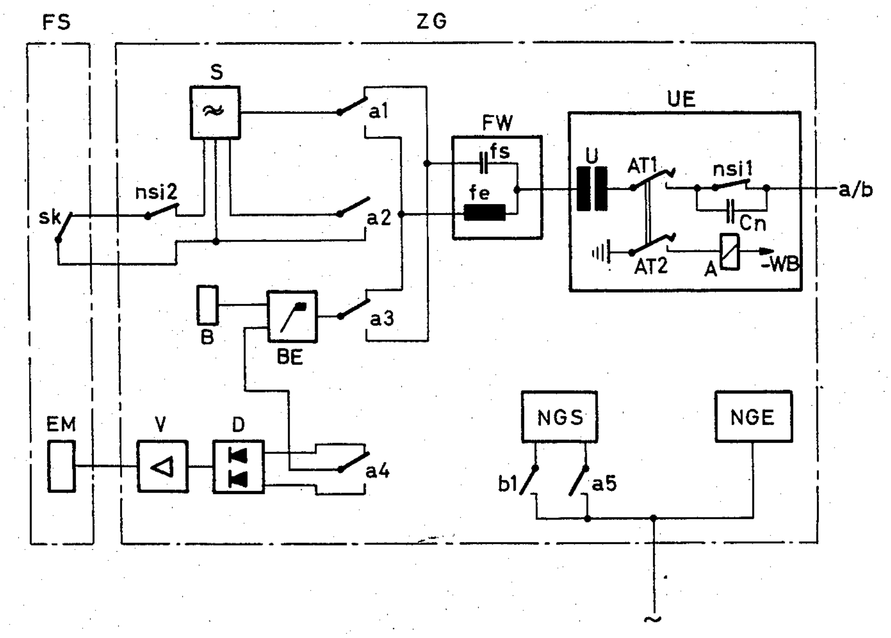
Figure 3:
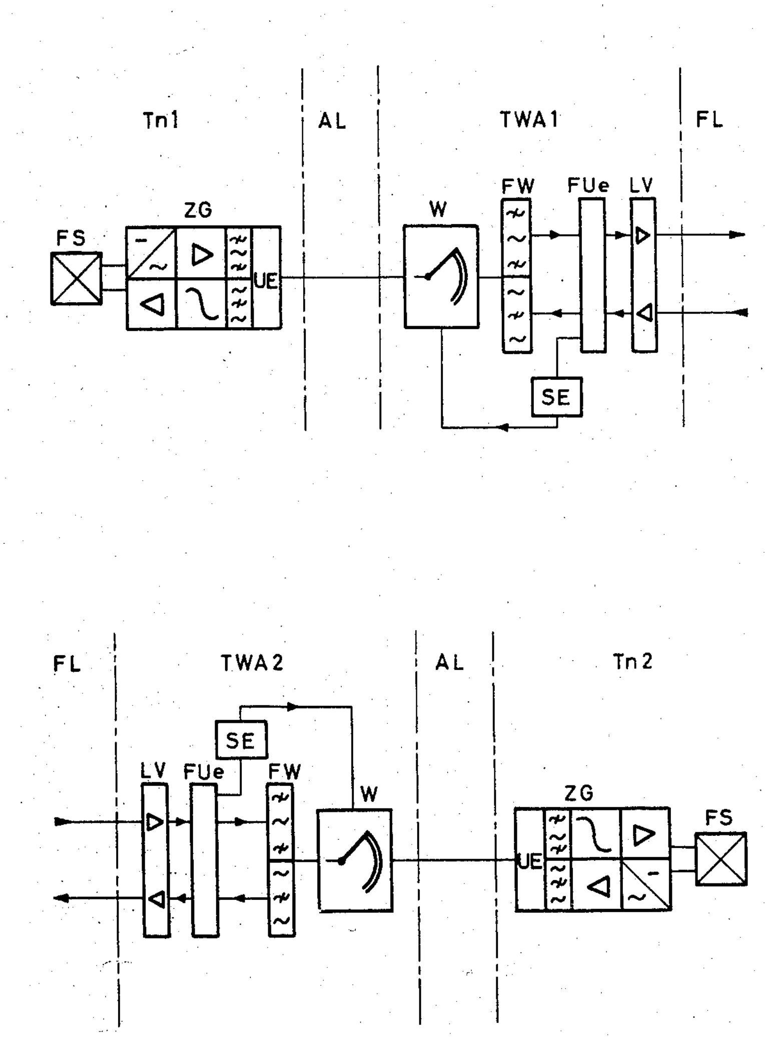

Fig. 1 shows a basic circuit diagram illustrating a connection path according to the prior art technique in which messages are transmitted by the use of direct current;

Fig. 2 shows in diagrammatic manner a circuit of a subscriber station according to the invention for the transmission and reception of messages in the form of frequency modulated tone frequency signals; and Fig. 3 shows in schematic manner a basic circuit of a connecting path for the transmission of messages in accordance with the invention with the use of frequency modulated tone frequency signals.

Referring now to Fig. 1, the subscriber T*n*1 shown on the left hand side top portion of the diagram has a teleprinter FS and a toll switching device FG and is connected by way of the subscriber's line AL1 with the corresponding subscriber's automatic exchange TWA1 containing for each subscriber a line circuit T*n*S, selectors W, the toll transmission device F*ue* and the frequency modulation devices FM—WT for the bunching of the individual teleprinter channels. It is entirely possible to effect the bunching in such a manner that up to 24 teleprinter channels can be provided in a single telephone channel of the toll line FL. The subscriber T*n*2 shown on the right hand side bottom portion of the diagram is connected to toll lines over similar devices.

Below each portion of the diagram are shown current-time curves for the individual types of current which are used on the various sections of the line for the transmission of a message. From the subscriber T*n*1 there are transmitted single-current signals which are converted into double-current signals at the subscriber line circuit T*n*S. In the frequency-modulating device FM—WT, there is effected a further conversion of the double current signals into a frequency-modulated tone frequency in order, on the one hand, to provide for transmission over toll lines and, on the other hand, to achieve a favorable utilization of such lines. At the end of the toll lines, looking in the direction toward the desired subscriber, all these transformations are effected in reversed order, as shown in the bottom diagram, and the message is transmitted to the subscriber T*n*2 in the form of single current signals.

This technique, as compared with single-tone telegraphy, provides for good utilization of the toll lines, and favorable possibilities for supervision of the connections by the use of specific direct current criteria (continuous spacing current in the direction to the calling subscribers for check-back supervision of the operating condition). However, this requires a great number of switching means for the current conversions to be effected in the course of the path of a connection, particularly if several toll lines are serially connected over exchange equipment.

As compared with this situation, the object of the present invention is to provide a switching arrangement for the transmission and reception of the telegraphically transmitted messages which makes it possible to transmit the messages in such a type of current that terminal relay switchings and repeated transformations of the type of message current are avoided in the transmission path. The type of current used shall also permit economic utilization of the toll lines, permit dependable supervision of the connections and be as insensitive as possible to disturbance.

In accordance with the invention, this is achieved by a switching arrangement in which the tone frequency produced by a tone frequency transmitter arranged in the calling subscriber's loop is modulated in frequency by the transmission elements of the teleprinter and the teleprinter signal element combinations are transmitted to the called subscriber as frequency-modulated tone frequency without the aid of relays over all connecting devices disposed in the course of the transmission path.

The advance in the art achieved by the invention resides in the fact that it is now possible to combine the known advantages of single-tone telegraphy—switching through without relays—and of alternating current telegraphy proceeding from direct current—namely, favorable utilization of the long-lines—in a single system, and furthermore in the fact that frequency-modulation, in addition to its known advantages—low susceptibility to disturbance and favorable regulation of the noise level—makes it possible to effect without special measures a supervision of connections since the "no-current" condition represents an unequivocal release criterion.

For carrying out of the invention, tone frequency transmitters and receivers may be provided either directly at the subscriber station or at the exchange and connected in the subscriber's loop. When arranged in the exchange, they may also be used as central equipment common to several subscribers. The audio-frequency transmitter, in normal condition, may be tuned to a given transmitting frequency which is the same for all subscribers connected to the central equipment, while the tone frequency receiver, in normal condition, may also be tuned to a receiving frequency which is the same for all subscribers connected to switching installation but is different from the transmitting frequency, the receiver converting teleprinter signal element combinations arriving as frequency-modulated tone frequency, into direct current signal element combinations for the control of the corresponding receiving magnet.

In accordance with a further feature of the invention, the tone frequency transmitter as well as the tone frequency receiver may be adapted to be tuned to both operating frequencies, and the respective transmitting frequency and receiving frequency may be interchanged with each other at the calling subscriber's upon initiation of a connection.

In accordance with the invention, both the tone frequency transmitters and the tone frequency receivers may comprise transistors. The apparatus is in this way, in case of a call, always immediately operable without requiring considerable normal current flow and there are no waiting times caused by the heating up of tubes.

In accordance with the invention, the tone frequency transmitting device may also be connected with the impulse contact of the subscriber's dial so that the direct current dial pulses produced responsive to the actuation of the dial are additionally transmitted in the form of tone frequency pulses. It is in this way possible, in connection with calls extending over toll lines, to set the selectors lying ahead a toll line by the direct current dial pulses, and the selectors following the toll line, by the tone frequency pulses.

The subscriber station, shown in Fig. 2, developed in accordance with the invention, comprises the teleprinter FS of which only the transmitter contact *sk* and the receiver magnet EM are indicated, and an additional device ZG constructed in accordance with the invention, which is controlled by the teleprinter and transmits the messages in the form of a frequency modulated tone frequency, and also conducts the messages intended for the subscriber and arriving in the form of a frequency modulated tone frequency to the receiver magnet EM as direct current signal elements.

The additional apparatus comprises as main components the tone frequency transmitter S, the frequency of which may be modulated, and as receiver member a limiter BE, a discriminator D and a receiving amplifier V. The two transmission devices are operatively connected by a frequency gate FW; a transmission device UE is provided for establishing connection with a subscriber line *a*/*b*. The transmission device UE may be of the general type as described in United States Patent No. 2,606,961.

In accordance with the invention, there is allotted to the transmitting device a specific transmitting frequency *fs* and to the receiving device a specific receiving frequency *fe* to which frequencies the respective devices are tuned in normal condition. Both devices, however, may be switched in their frequency so that upon initiation of a connection, the transmitting frequency and the receiving frequency at the transmitting subscriber can be switched to the respective frequencies of the other station. In accordance with the invention, a switch contact AT2 of the calling key is for this purpose provided in the energizing circuit of a switching relay A, the contacts *a*2 and *a*4 of which effect the frequency switching. The contacts *a*1 and *a*3 assure the correct connection to the frequency gate FW.

In accordance with a further feature of the invention, the transmitting contact *sk* of the teleprinter is for the frequency modulation of the tone frequency so connected with the sound frequency transmitter that, upon closure, and therefore in the case of direct current technique, the sending out of a spacing current step, it connects or disconnects a capacitor, not shown, in parallel to the oscillator of the tone frequency transmitter. This may be done in the manner as described, for example, in United States Patent No. 1,732,741 or as described in the French Patent No. 834,864. In accordance with the invention, the frequency modulation is effected by displacing the two transmission frequencies (*fs, fe*) upon modulation with the current signals representing the message in opposite direction, preferably in such a manner that in the case of a spacing current step, the higher of the two transmission frequencies is displaced toward a higher frequency and the lower of the two transmission frequencies to a lower frequency. This type of modulation permits an advantageous dimensioning of the filters provided in the transmission path.

In order to make the apparatus ready to receive a call at any time, transistors may be provided in accordance with the invention in the receiving amplifier and sound frequency transmitter, instead of tubes.

The operation is as follows:

To make a connection, the subscriber first actuates the calling key AT, thereby closing contact AT1 and over such contact the loop of the subscriber's line *a*/*b* which leads in known manner to seizure of exchange switching apparatus. Closing of the contact AT2, completes at the same time an energizing circuit for the switching relay A (ground, AT2, A, —WB) which actuates contacts *a*2 and *a*4 into alternate position and thereby producing the frequency switching described before. Contacts *a*1 and *a*3 connect the transmitter and receiver respectively to the required paths of the frequency gate FW. Contact *a*5 connects the power unit of the transmitter to the power line. After the switching, the tone frequency transmitter of the calling subscriber therefore will transmit at the frequency to which all receivers of the connecting equipment are tuned in normal condition while the receiver of the calling subscriber is tuned to the frequency with which the called subscriber will transmit.

By the actuation of the dial pulse contact *nsi*1, disposed in the transmission device UE, the subscriber can on the one hand send out direct current pulses via the subscriber's line to the central office which pulses serve for the setting of the selectors arranged ahead of a toll line, and on the other hand, by the second dial pulse contact *nsi*2, tone frequency pulses which can be used for setting selectors following the toll line. For this reason, the contact *nsi*1 is bridged by a capacitor C*n*. The path which the tone frequency pulses take is as follows: Tone frequency transmitter S, *a*1, frequency gate FW, transformer U, At1, *cn*, *a*/*b*. After the connection has been made, the subscriber can transmit his message in the form of a frequency-modulated tone frequency, the frequency modulation being effected by the actuation of the transmitting contact *sk* of the teleprinter.

All check back signals occurring in the course of the making of the connection and the exchange of the message pass to the calling subscriber via the following path: Subscriber's line *a/b*, transmission device UE, frequency gate FW, limiter BE, *a*4, discriminator D, receiving amplifier V, receiving magnet EM.

In accordance with the invention, there is connected to the limiter BE a relay B which is excited after the change in frequency by the continuous tone transmitted by the called subscriber and by means of a contact which is not shown, connects the teleprinter of the calling subscriber in known manner as indication that the called subscriber is ready to receive. At the called subscriber's, the contact *b*1 effects the connecting of the power pack NGS as soon as the call has arrived.

In Fig. 3, there is shown the basic diagram of a connecting path such as would result upon operation with the type of current used in accordance with the invention, namely frequency modulated tone frequency.

In accordance with the invention, auxiliary equipment, constructed in accordance with the invention, for instance as shown in Fig. 2, is arranged in series with the teleprinter in the subscriber's loop which extends from the exchange to the subscriber. This auxiliary equipment may either, as shown in the drawing, be arranged in its entirety at the subscriber, or it may be subdivided into its structural components and arranged partly at the subscriber and partly at the exchange part of the subscriber loop.

The subscriber's exchange TWA1 now requires only selectors W and, if four-wire channels with multiple channel utilization are used, a frequency gate FW, toll transmission devices FU*e*, and a line amplifier LV. To the toll transmission devices FU*e* there are connected in accordance with the invention signal receivers SE which in incoming calls evaluate the frequency modulated signals arriving over the toll lines, for instance dial criteria or connection control signals and effect the setting of the selectors. After building up the connection, these signal receivers are disconnected so that no erroneous connections can be made by the teleprinter signal element combinations which now follow.

The operation of the circuit is as follows:

The subscriber by pressing the call key connects his auxiliary device ZG and by actuating the dial transmits pulses which, as already described, serve to set the selectors located respectively ahead of and following the toll line. Upon reaching subscriber T*n*2, the latter sends back a continuous tone which is frequency-modulated corresponding to the spacing position to which tone the receiver of the calling subscriber was tuned already at the time of the pressing of the call key. This continuous tone connects the teleprinter at the calling subscriber and thus makes known that the transmission of the message can be started. Furthermore, this continuous tone and thus the operation of the teleprinter during the exchange of the message is an indication that the office called is ready for reception. In accordance with the invention, therefore, the connecting and disconnecting of the teleprinters is effected by the continuous tones which result in normal condition upon frequency modulation.

In the exchanges TWA1 and TWA2, there are provided in accordance with the invention, at both ends of the toll lines a relay-free frequency converter for each available telegraph channel, both on the transmitting end and on the receiving end, these frequency converters, converting, in the direction from the calling subscriber to the toll line, the frequency modulated alternating currents which are tuned in each case to a standard frequency, to the frequency associated with the seized telegraphy channel or, in the direction from the toll line to the called subscriber, effects a corresponding reconversion. The line amplifiers LV serve to counteract the line attenuation occurring on the long lines.

As will be noted from the above explanations, the invention makes it possible by the transmission of a frequency-modulated tone frequency from the subscriber to avoid any current transformations along the connecting path without thereby producing other disadvantages.

Changes may be made within the scope and spirit of the appended claims.

We claim:

1. In a system for transmitting teleprinter messages including calling and called stations, each station having a teleprinter and a tone frequency transmitter and a tone frequency receiver, means for tuning said tone frequency transmitter to two frequencies, means at each station depending upon the operation thereof respectively as a calling or as a called station for determining the application of one of said frequencies as the transmitting frequency and of the other frequency as the receiving frequency, connection means for connecting a calling station with a called station, line means for connecting said calling and called stations with said connection means, a frequency gate at each station, branch circuit means extending from said frequency gate respectively to said frequency transmitter and to said frequency receiver, switching means at each station for selectively connecting said branch circuit means with said tone frequency transmitter and with said tone frequency receiver depending upon the operation of said station as a calling or as a called station, means controlled by the teleprinter at the calling station for modulating the frequency of the transmitter current produced by said tone frequency transmitter in accordance with the current-type of the individual teleprinter signal elements, means at the called station for demodulating the received frequency-modulated currents, switching means controlled from the calling station upon extending a call for altering the frequency of the current normally flowing over said line means, frequency-sensitive means responsive to the alteration of said frequency for automatically switching-in the called station, and means for automatically disconnecting a station responsive to reoperation of said switching means and consequent restoration of the frequency of the current normally flowing over said line means.

2. A system and cooperation of parts according to claim 1, comprising further switching means operable only at the calling station for setting the frequency-determining means of said tone frequency transmitter and of said tone frequency receiver each to a predetermined one of the two frequencies and for operatively interchanging said frequencies.

3. A system and cooperation of parts according to claim 2, comprising frequency-modulating switching means controlled by said further switching means for frequency-modulating the higher of the two frequencies toward a higher frequency and the lower of the two frequencies toward a lower frequency.

4. A system and cooperation of parts according to claim 1 wherein said tone frequency transmitter and said tone frequency receiver comprise transistors as component parts thereof.

5. A system and cooperation of parts according to claim 1, comprising control means in said tone frequency transmitter governed by contact means operable by the actuation of the dial at the calling station for transmitting the direct current impulses produced responsive to operation of said dial in the form of tone frequency selection impulses.

6. A system and cooperation of parts according to claim 5, comprising selector means disposed along the connection path, control means for evaluating the transmitted tone frequency selection impulses for the setting of said selector means, and means for thereafter disconnecting said control means.

7. A system and cooperation of parts according to claim 1 comprising means for bunching available connection paths.

8. A system and cooperation of parts according to claim 7, comprising frequency conversion means at each end of a connection path for each telegraph channel for converting the tuned and frequency-modulated incoming currents into a frequency position allotted to the respective telegraph channel and for reconverting the frequency of the outgoing currents for utilization in the direction of the called station.

9. A system and cooperation of parts according to claim 1, comprising an oscillator for the tone frequency transmitter of each station, a capacitor in the circuit of said oscillator, means for connecting the oscillator with the transmitter contact of the teleprinter, the closure of said transmitter contact effecting short-circuiting of said capacitor.

References Cited in the file of this patent

UNITED STATES PATENTS

| | | |
|---|---|---|
| 1,732,741 | Conrad | Oct. 22, 1929 |
| 2,060,250 | Searle | Nov. 10, 1936 |
| 2,154,441 | D'Humy | Apr. 18, 1939 |
| 2,352,918 | Smith | July 4, 1944 |
| 2,823,261 | Zipf | Feb. 11, 1958 |